United States Patent Office 3,532,674
Patented Oct. 6, 1970

3,532,674
FLUOROALKOXYALKYL 2-CYANOACRYLATES AND POLYMERS THEREOF
Elden H. Banitt, Woodbury Village, Minn., assignor to Minnesota Mining and Manufacturing Company, St. Paul, Minn., a corporation of Delaware
No Drawing. Filed June 4, 1968, Ser. No. 734,195
Int. Cl. C08f 3/62, 3/74
U.S. Cl. 260—78.4                           10 Claims

ABSTRACT OF THE DISCLOSURE

Fluorinated alkoxyalkyl 2-cyanoacrylates having the formula

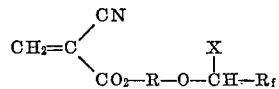

wherein R is a straight or branched divalent aliphatic hydrocarbon radical having from 2 to 8 carbon atoms; $R_f$ is a straight or branched fluoroaliphatic radical having from 1 to 5 carbon atoms and X is R—H, $CH_3$, $R_f$ or H, have been found to be useful adhesives which when applied as monomers to adherends rapidly polymerize in the presence of even small amounts of, e.g., moisture, to form strong bonds which retain their strength in the presence of aqueous fluids for unusually long periods of time.

FIELD OF THE INVENTION

This invention relates to compositions which polymerize rapidly to form coatings and adhesives. More particularly the invention relates to fluorine-containing alkoxyalkyl 2-cyanoacryate monomers which polymerize to form adhesive bonds which possess unusual strength and stability in the presence of water. The monomers of the invention are therefore useful in adhesive compositions which are used for adhering objects in the presence of moisture; an extremely small variation in volume occurs during and after polymerization. It has been observed that the adhesive bonds formed by the fluoroalkoxyalkyl 2-cyanoacrylates of the invention, when compared with the bonds formed by the analogous non-fluorinated 2-cyanoacrylates, surprisingly possess greatly improved strength and stability in the presence of water.

PRIOR ART

Alkoxyalkyl 2-cyanoacrylates are known and have been used in adhesive compositions; see, e.g., Joyner, U.S. Pat. 2,784,215, Mar. 5, 1957. The adhesive bonds formed by these non-fluorinated monomers upon polymerization, however, are significantly weaker and less stable in water than the bonds formed by the fluorinated monomers of the present invention.

As far as is known, however, fluorinated alkoxyalkyl 2-cyanoacrylates have not previously been reported nor have their unusual properties been suggested.

Accordingly, it is an object of the present invention to provide new monomers which polymerize to form adhesive bonds which are unusually strong and stable, particularly in the presence of water.

Another object of this invention is to provide fluorine-containing alkoxyalkyl 2-cyanoacrylate monomers which can be used as the basic components of adhesive compositions for bonding a great variety of similar or dissimilar materials by polymerization upon exposure to small amounts of moisture without the use of heat or catalyst.

Another object of the present invention is to provide new monomers which provide bond-forming polymers by merely being spread in a thin film, and which can be readily stored for prolonged periods of time in monomeric form without undergoing autopolymerization.

Other objects will be apparent from the description and claims which follow.

SUMMARY OF THE INVENTION

The class of monomeric 2-cyanoacrylate esters which comprises this invention is represented by the structural formula:

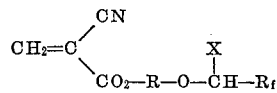

wherein R is a straight or branched divalent aliphatic hydrocarbon radical having from 2 to 8 carbon atoms, e.g., ethylene, propylene, trimethylene, 1,2-butylene, 2,3-butylene, tetramethylene and the like; $R_f$ is a straight or branched fluoroaliphatic radical having from 1 to 5 carbon atoms; and X is R—H, $CH_3$, $R_f$ or H. The term "fluoroaliphatic radical" is herein defined to include straight or branched chain alkyl radicals containing as substituents at least one fluorine atom per carbon atom, and if chlorine is present a ratio of no more than one chlorine atom per carbon atom. While all of the above described compounds are within the scope of the present invention, preferred compounds are those in which $R_f$ is defined as $R_f'$—Y, wherein $R_f'$ is perfluoroalkylene and Y is H or F, for example,

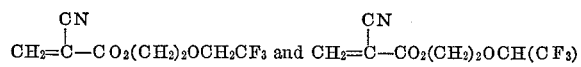

The preferred compounds form adhesive bonds which exhibit exceptional stability and strength in the presence of water but yet retain exceptional flexibility.

In most bonding applications employing monomers of the invention, polymerization is catalyzed by small amounts of moisture on the surface of the adherends. Thus, a drop of monomer can be placed on the surface of, e.g., one of two metal or glass pieces which are to be adhered and the other piece brought into contact therewith. The pieces are held in contact until polymerization is well advanced. A strong bond is soon formed by polymerization. Moisture in the atmosphere is sufficient to catalyze the polymerization.

When the bonds thus formed are exposed to aqueous fluids, e.g., by immersion, for extended periods of time they retain good bond strength and stability. These results are unobvious from the results obtained when bonds formed from the corresponding unfluorinated alkoxyalkyl 2-cyanoacrylates are similarly exposed to aqueous fluids. The latter quickly lose strength.

The monomers of the invention are effective in adhesive formulations with the fluoroalkoxyalkyl 2-cyanoacrylates as the major active constituent. Thus, the cyanoacrylate may be combined in admixture with a polymerization inhibitor (e.g., sulfur dioxide). One or more adjuvant substances, such as thickening agents, plasticizers, or the like, to improve the adaptability of the monomer, can also be present. Such adjuvant materials as may be selected must not cause premature polymerization of the adhesive before its intended use.

Depending on the particular requirements of the user, these adhesive compositions can be applied by known means, such as with a glass rod, a brush, or medicinal dropper; however, in some situations a pressurized aerosol dispensing package in which the adhesive composition is in solution with a compatible anhydrous propellant can be used.

In addition to their use as adhesives the monomers are readily polymerized to addition-type polymers and copolymers, which are generally optically clear (as films) and are thermoplastic and moldable at temperatures below their decomposition temperature. They can be shaped at temperatures in the range of 100° to 150° C. The polymers have the general formula:

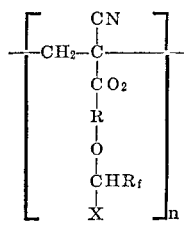

wherein R, $R_f$ and X are as defined above and $n$ is an integer from 5 to 500.

Polymerization may occur by free radical initiation or exposure to small amounts of base, e.g., triethylamine, or water. A liquid monomer can be spread on, e.g., a polyethylene surface and exposed to triethylamine to bring about polymerization to a coating which can be peeled from the polyethylene as a self-supporting, optically clear film.

The method of preparing high purity (95 percent or greater) fluoroalkoxyalkyl 2-cyanoacrylates comprises catalyzing the condensation of formaldehyde with esters of the corresponding cyanoacetic acids by means of a mixture of an acid and the acid salt of an alkyl primary or secondary amine. The resulting fluoroalkoxyalkyl 2-cyanoacrylate polymers are then thermally depolymerized to obtain the desired monomer. Thermal depolymerization may be carried out by techniques described in U.S. Pats. 2,784,215; 2,721,858 and 2,763,677, and illustrated in the examples set out below.

With particular reference to the preparation of the fluoroalkoxyalkyl 2-cyanoacrylate esters of the present invention, the method of preparation employs the cyanoacetates corresponding to the desired cyanoacrylates (e.g., 2-(2,2,2-trifluoroethoxy)-ethyl cyanoacetate for 2-(2,2,2-trifluoroethoxy)ethyl 2-cyanoacrylate). The cyanoacetate is reacted with formaldehyde or polymers thereof, such as paraformaldehyde. Aqueous solutions of formaldehyde as typified by formalin are not useful, however. The reaction medium may be any suitable inert organic solvent capable of forming an azeotrope with water.

The essential feature of the synthesis is the particular combination of catalytic materials employed. Any acid salt of an alkyl primary or secondary amine and any free acid may be utilized as components of the catalytic mixture, provided they establish the necessary pH value as described in detail below.

All phases of the synthetic sequence are carried out under acidic conditions. A criterion for utility of the catalytic mixture selected is that it have a "corrected pH value" of not over pH 5. This pH value can be determined as follows:

The exact amounts of amine acid salt and free acid to be used in the condensation step are dissolved in 25 ml. of water, and the pH of the solution is measured. If the resulting pH value is 5 or less, the mixture will adequately catalyze the condensation reaction. When the mixture is soluble in water, this is the "corrected pH value."

Catalytic mixtures comprising organic acid which are not readily soluble in water may be dissolved in 25 ml. of an ethanol-water mixture; however, the measured pH must then be corrected as described by B. Gutbezehl and E. Grunwald in J. Am. Chem. Soc., 75, 565 (1953).

Both primary or secondary amine salt and free acid are always present. Glacial acetic or strong mineral acids such as hydrochloric acid or sulfuric acid are preferred. The amount of catalyst employed is not critical and may be varied. Ordinarily a small amount, e.g., 0.5 to 1.0 percent by weight, based on the weight of cyanocetic ester, is adequate.

Other than employing the amine acid salt and free acid, the condensation of cyanoacetic esters with formaldehyde and the subsequent depolymerization process are carried out by methods similar to prior art methods.

Esters of cyanoacetic acid which are employed in the preparation of the desired fluoroalkoxyalkyl 2-cyanoacrylate polymers are readily preparable by direct esterification of cyanoacetic acid in the presence of an acid catalyst, such as sulfuric acid or the like with alcohols represented by the formula:

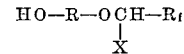

in which R, $R_f$ and X have the values assigned above. Said alcohols are known to the art, or may be prepared by well-known methods such as the base-catalyzed reaction of a fluorine-containing alcohol with an epoxide, and the displacement reaction of a fluorine-containing alkoxide with a halo-alcohol wherein the halo atom is chloro, bromo or iodo.

Although polymerization occurs rapidly when the monomers are spread in a thin film under ambient atmospheric conditions, fluoroalkoxyalkyl 2-cyanoacrylate monomers have a reasonably good stability when stored in bulk in admixture with small amounts of polymerization inhibitor. In low concentrations, polymerization inhibitors impart acceptable shelf life to the adhesive composition without interfering with adhesive utility. Suitable inhibitors or stabilizers include Lewis acids such as sulfur dioxide, nitric oxide, boron trifluoride and other acidic substances including hydroquinone, nitrohydroquinone, catechol, 4-methoxyphenol and 4-ethoxyphenol. One or more of these adjuvant substances may be used, preferably in concentrations of e.g., 10–700 p.p.m.

The following examples will illustrate preferred embodiments of the invention. It will be understood, however, that the examples are included merely for the purposes of illustration and are not intended to limit the scope of the invention, unless otherwise specifically indicated. All parts are by weight unless otherwise specified, and the pressures are shown in millimeters of mercury.

EXAMPLE 1

2-(2,2,2-trifluoroethoxy)-ethanol

Method A.—A concentrated solution of potassium 2,2,2-trifluoroethoxide is prepared by heating 61.8 g. of potassium hydroxide (1.1 mole) in 150 g. of 2,2,2-trifluoroethanol (1.5 moles) to 90° C. for one hour. 80.5 g. of 2-chloroethanol (1.0 mole) is then added dropwise with good stirring over 3.5 hours at 90° C. The thick, brown mixture is filtered to remove salt, concentrated under vacuum and crudely distilled. Redistillation through the spinning band column provides purified product alcohol, B.P. 84° C./70 mm.; $n_D^{27°}=1.3545$.

*Analysis.*—Calc'd for $C_4H_7F_3O_2$ (percent): C, 33.3; H, 4.9. Found (percent): C, 32.9; H, 4.8.

Method B.—Into a 1-liter round-bottomed flask equipped with mechanical stirrer and two Dry Ice condensers are placed 340 g. of 2,2,2-trifluoroethanol (3.4 moles), 3.4 g. of sodium hydroxide and 3.4 ml. of water. The mixture is heated to 70° C. and stirred. About 100 g. of ethylene oxide (2.27 moles) is introduced as a gas into the top of one of the condensers over a period of 3.5 hours and allowed to condense into the reaction mixture. The mixture is stirred at 70° C. for an additional four hours and distilled through a glass helices-packed column. Excess 2,2,2-trifluoroethanol is recovered together with a fraction boiling at 71–81° C./36–85 mm., composed of 91 percent product alcohol and 9 percent 2,2,2-trifluoroethanol.

The following precursor fluoroalkoxy alcohols are prepared by the general procedures described in Methods A or B, above:

concentrated under vacuum. Distillation of the residue provides the corresponding cyanoacetate, B.P. 98–102° C./0.1–0.2 mm. The infrared spectrum is identical to that of the material obtained in Method A.

EXAMPLE 3

A solution of 170.2 g. of cyanoacetic acid (2.0 moles), 0.5 ml. of concentrated sulfuric acid and 2.1 moles of 2-(1,1,1,3,3,3-hexafluoroisopropoxy)-ethanol in 400 ml. of benzene is heated under reflux. When no more water separates, the benzene solution is cooled, washed with water, then with 5 percent sodium bicarbonate solution and dried over sodium sulfate. Filtration, removal of benzene under reduced pressure and fractional distillation yields 2-(1,1,1,3,3,3-hexafluoroisopropoxy)-ethyl cyanoacetate, B.P. 91–94° C./0.05 mm.

EXAMPLE 4

The procedure of Example 3 is followed using 2.1 moles of 2-(2,2,3,3-tetrafluoropropoxy)-ethanol in place of 2-(1,1,1,3,3,3-hexafluoroisopropoxy)-ethanol. The product, 2-(2,2,3,3-tetrafluoropropoxy)-ethyl cyanoacetate, boils at 110–111° C./0.5 mm.

| | Starting materials | | |
|---|---|---|---|
| | Fluorinated alcohol | Epoxide or haloalcohol | Product |
| A | $CH_3-\underset{OH}{CH}-CF_3$ | $CH_2CHCH_3$ (epoxide) | $HOCHCH_2OCHCF_3$ with $CH_3$ and $CH_3$ |
| B | $Cl(CF_2CFCl)_2CF_2CH_2OH$ | $CH_2\!-\!CH_2$ (epoxide) | $HO(CH_2)_2OCH_2CF_2(CFClCF_2)_2Cl$ |
| C | $H(CF_2)_4CH_2OH$ | $Br(CH_2)_4\underset{OH}{CH}CH_3$ | $HO\underset{CH_3}{CH}(CH_2)_4OCH_2(CF_2)_4H$ |
| D | $CF_3(CF_2)_2CH_2OH$ | $Br(CH_2)_3OH$ | $HO(CH_2)_3OCH_2(CF_2)_2CF_3$ |
| E | $CF_3(CF_2)_2\underset{OH}{CH}CHClCH_3$ | $CH_2CHCH_2CH_2CH_3$ (epoxide) | $HOCHCH_2OCH$ with $CHClCH_3$, $(CH_2)_2CH_3$, $(CF_2)_2CF_3$ |
| F | $CF_3CF_2\underset{OH}{CH}CH_2CH_3$ | $CH_2\!-\!CH_2$ (epoxide) | $HO(CH_2)_2OCH$ with $CH_2CH_3$, $CF_2CF_3$ |
| G | $CF_3(CF_2)_2\underset{OH}{CH}CF_2CF_3$ | $CH_2\!-\!CH_2$ (epoxide) | $HO(CH_2)_2OCH$ with $CF_2CF_3$, $(CF_2)_2CF_3$ |
| H | $H(CF_2)_2(CH_2)_3OH$ | $BrCH_2CH_2OH$ | $HO(CH_2)_2O(CH_2)_3CF_2CF_2H$ |

EXAMPLE 2

2-(2,2,2-trifluoroethoxy)-ethyl cyanoacetate

Method A.—Crude cyanoacetyl chloride prepared from 51.0 g. of cyanoacetic acid (0.6 mole) and 125.0 g. of phosphorus pentachloride (0.6 mole) is treated with 93 g. of 2-(2,2,2-trifluoroethoxy)-ethanol (0.645 mole) introduced in increments over a period of one hour to avoid overheating. The reaction is thereafter forced to completion by heating to 65° C. for two hours. Crude product boiling at 102–108° C./0.1 mm. is distilled directly from the reaction vessel and redistilled through a spinning band column, B.P. 85–86° C./0.1 mm.

*Analysis.*—Calc'd for $C_7H_8F_3NO_3$ (percent): C, 39.8; H, 3.8. Found (percent): C, 39.5; H, 3.8.

Method B.—85.1 g. of cyanoacetic acid (1.0 mole) is esterified with 192.5 g. of 2-(2,2,2-trifluoroethoxy)-ethanol (1.25 moles) by heating a mixture of the two reagents in 300 ml. of benzene containing 0.25 g. of p-toluenesulfonic acid. When no more water separates in a Dean-Stark trap, the benzene solution is cooled, filtered and

EXAMPLE 5

2-(2,2,2-trifluoroethoxy)-ethyl 2-cyanoacrylate

A mixture of 422.4 g. of 2-(2,2,2-trifluoroethoxy)-ethyl cyanoacetate (2.0 moles), 78 g. of powdered paraformaldehyde (2.6 moles), 2.5 g. of piperidine hydrochloride and 1 ml. of glacial acetic acid in 800 ml. of benzene is heated under reflux until no further water separates. The resulting solution is diluted with 400 ml. of acetone, filtered, combined with 210 g. of tricresylphosphate and concentrated by distillation at reduced pressure. 10 g. of polyphosphoric acid and 0.5 g. of pyrogallol are added to the viscous residue, and depolymerization is effected by heating this mixture under reduced pressure using a good sulfur dioxide bleed into the reaction vessel and rapid mechanical stirring. Crude monomer weighing 310 g. is collected in a Dry Ice-cooled receiver at a bath temperature/system pressure of 185–195° C./0.15 mm. Redistillation from a small amount of phosphorus pentoxide in the presence of sulfur dioxide provides +99 percent pure monomeric product.

EXAMPLE 6

The following 2-cyanoacrylates are prepared by the general procedures of Examples 2 and 5, utilizing the precursor fluoroalkoxy alcohols A through H of Example 1:

| | Starting materials—Cyanoacetic acid and fluoroalkoxyalcohol below | Product |
|---|---|---|
| I | $HOCHCH_2OCHCF_3$<br>      $|$                $|$<br>    $CH_3$         $CH_3$ | $CH_2=\overset{CN}{\underset{|}{C}}CO_2CHCH_2OCHCF_3$<br>              $|$                $|$<br>            $CH_3$         $CH_3$ |
| J | $HO(CH_2)_2OCH_2CF_2(CFClCF_2)_2Cl$ | $CH_2=\overset{CN}{\underset{|}{C}}CO_2(CH_2)_2OCH_2CF_2(CFClCF_2)_2Cl$ |
| K | $HOCH(CH_2)_4OCH_2(CF_2)_4H$<br>   $|$<br>  $CH_3$ | $CH_2=\overset{CN}{\underset{|}{C}}CO_2CH(CH_2)_4OCH_2(CF_2)_4H$<br>                $|$<br>              $CH_3$ |
| L | $HO(CH_2)_3OCH_2(CF_2)_2CF_3$ | $CH_2=\overset{CN}{\underset{|}{C}}CO_2(CH_2)_3OCH_2(CF_2)_2CF_3$ |
| M | $HOCHCH_2OCH\begin{smallmatrix}\diagup CHClCH_3 \\ \diagdown (CF_2)_2CF_3\end{smallmatrix}$<br>   $|$<br>$(CH_2)_2CH_3$ | $CH_2=\overset{CN}{\underset{|}{C}}CO_2CHCH_2OCH\begin{smallmatrix}\diagup CHClCH_3 \\ \diagdown (CF_2)_2CF_3\end{smallmatrix}$<br>                $|$<br>          $(CH_2)_2CH_3$ |
| N | $HO(CH_2)_2OCH\begin{smallmatrix}\diagup CH_2CH_3 \\ \diagdown CF_2CF_3\end{smallmatrix}$ | $CH_2=\overset{CN}{\underset{|}{C}}CO_2(CH_2)_2OCH\begin{smallmatrix}\diagup CH_2CH_3 \\ \diagdown CF_2CF_3\end{smallmatrix}$ |
| O | $HO(CH_2)_2OCH\begin{smallmatrix}\diagup CF_2CF_3 \\ \diagdown (CF_2)_2CF_3\end{smallmatrix}$ | $CH_2=\overset{CN}{\underset{|}{C}}CO_2(CH_2)_2OCH\begin{smallmatrix}\diagup CF_2CF_3 \\ \diagdown (CF_2)_2CF_3\end{smallmatrix}$ |
| P | $HO(CH_2)_2O(CH_2)_3CF_2CF_2H$ | $CH_2=\overset{CN}{\underset{|}{C}}CO_2(CH_2)_2O(CH_2)_3CF_2CF_2H$ |

EXAMPLE 7

The procedure of Example 5 is followed utilizing as the cyanoacetate the product of Example 3 to obtain 2-(1,1,1,3,3,3-hexafluoroisopropoxy)-ethyl 2-cyanoacrylate, B.P. 123–125° C./2 mm.

EXAMPLE 8

The procedure of Example 5 is followed utilizing as the cyanoacetate the product of Example 4 to obtain 2-(2,2,3,3-tetrafluoropropoxy)-ethyl 2-cyanoacrylate, B.P. 120–128° C./0.6–0.8 mm.

What is claimed is:

1. A compound of the formula:

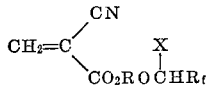

wherein R is a divalent straight or branched chain aliphatic hydrocarbon radical containing from 2 to 8 carbon atoms; $R_f$ is a straight or branched chain fluoroaliphatic radical containing from 1 to 5 carbon atoms; and X is selected from the group consisting of R—H, $CH_3$, $R_f$ and H where R and $R_f$ are as defined above.

2. A compound according to claim 1 wherein $R_f$ is $R_f'$—Y and $R_f'$ is a divalent straight or branched chain perfluoroalkylene radical containing about 1 to 5 carbon atoms and Y is selected from the group consisting of fluorine and hydrogen where R and $R_f$ are as defined in claim 1.

3. A compound according to claim 1 wherein R is —$CH_2CH_2$—; $R_f$ is —$CF_3$; and X is —H.

4. A compound according to claim 1 wherein R is —$CH_2CH_2$—; $R_f$ is —$CF_3$; and X is —$CF_3$.

5. A compound according to claim 1 wherein R is —$CH_2CH_2$—; $R_f$ is —$CF_2CF_2H$; and X is —H.

6. An adhesive composition which comprises a monomeric fluoroalkoxyalkyl 2-cyanoacrylate having the formula:

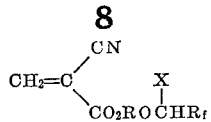

wherein R is a divalent aliphatic hydrocarbon radical, straight or branched chain, having from 2 to 8 carbon atoms; $R_f$ is a fluoroaliphatic radical, straight or branched chain, having 1 to 5 carbon atoms; X is selected from the group consisting of R—H, $CH_3$, $R_f$ and H where R and $R_f$ are as defined above; and in combination with said 2-cyanoacrylate an amount of polymerization inhibitor for cyanoacrylate-type polymerizations as a stabilizer therefor, said composition being capable of rapidly polymerizing upon exposure to small amounts of moisture.

7. A composition according to claim 6 wherein the polymerization inhibitor is sulfur dioxide.

8. An adhesive composition which polymerizes rapidly comprising a mixture of two of the compounds of claim 1, containing an amount of polymerization inhibitor as a stabilizer therefor.

9. A thermoplastic polymer of a monomer according to claim 1, consisting essentially of repeating units having the formula:

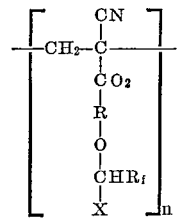

wherein R, $R_f$ and X are the same as described in claim 1 and $n$ is an integer from 5 to 500.

10. A thermoplastic polymer of a monomer according to claim 2, consisting essentially of repeating units having the formula:
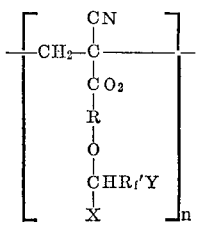
wherein R, $R_f'$, and Y are as defined in claim 2 and $n$ is an integer from 5 to 500.
No references cited.
JOSEPH L. SCHOFER, Primary Examiner
C. A. HENDERSON, JR., Assistant Examiner
U.S. Cl. X.R.
117—138.8, 161; 156—331; 161—188, 204, 218; 206—84; 260—465.4

UNITED STATES PATENT OFFICE
CERTIFICATE OF CORRECTION

Patent No. 3,532,674  Dated October 6, 1970

Inventor(s) Elden H. Banitt

It is certified that error appears in the above-identified patent and that said Letters Patent are hereby corrected as shown below:

Column 2, line 40 now reads as follows:

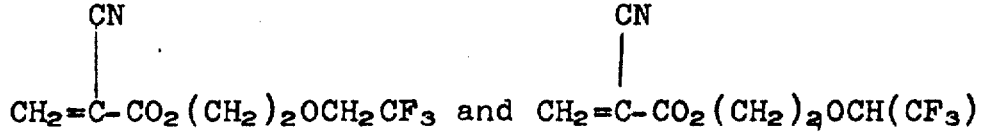

Should read:

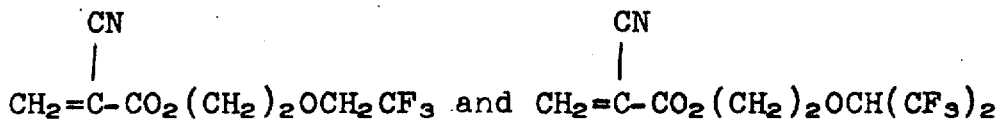

Signed and sealed Dec 15 1970

(SEAL)
Attest:

Edward M. Fletcher, Jr.
Attesting Officer

WILLIAM E. SCHUYLER, JR.
Commissioner of Patents